June 15, 1948.    C. H. O. BERG    2,443,532
WAX-OIL SEPARATION WITH DEHYDRATION OF SOLVENT THEREFOR
Filed July 9, 1945
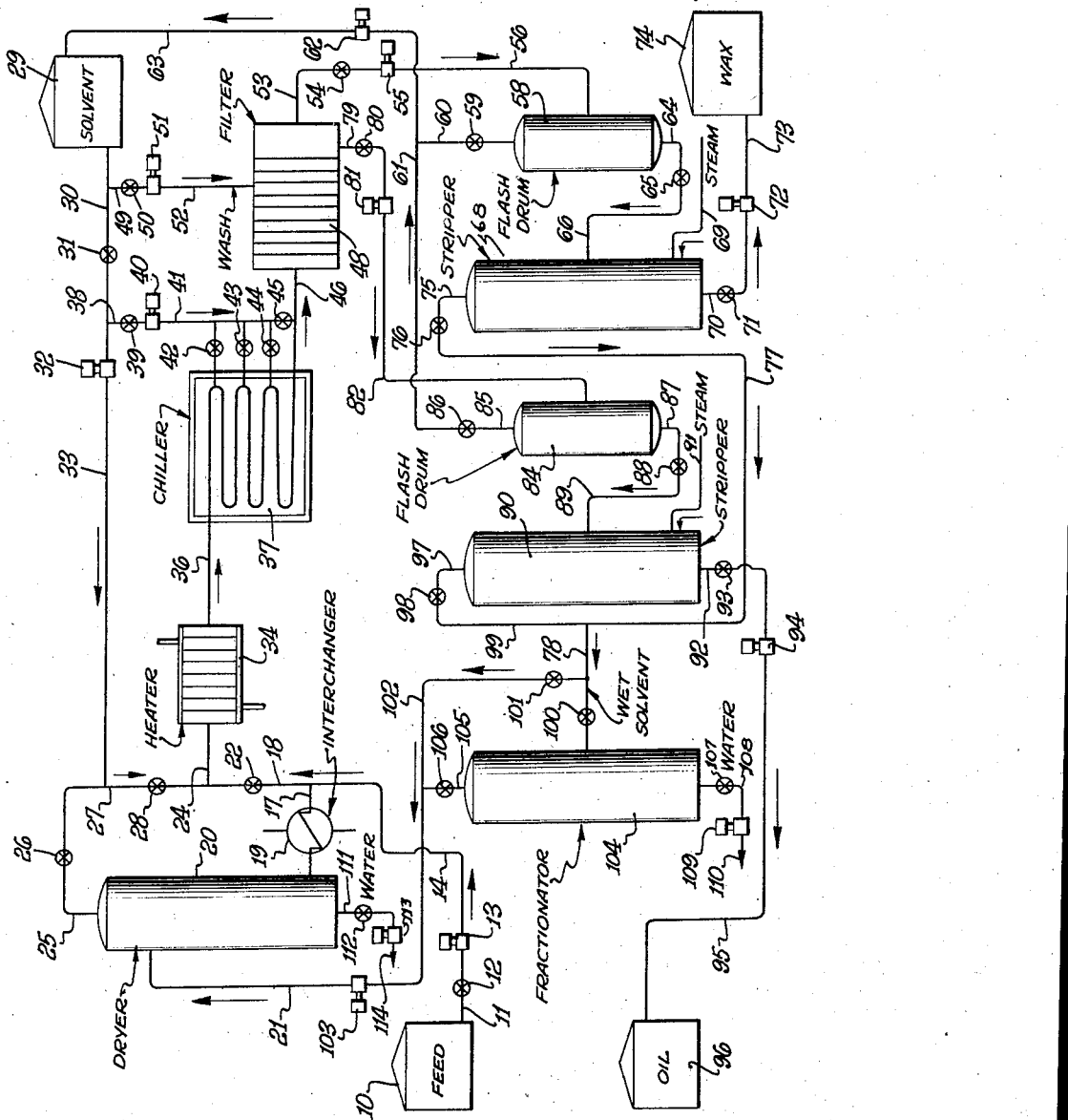
CLYDE H. O. BERG,
INVENTOR.
BY
Ross J. Garofalo
ATTORNEY.

Patented June 15, 1948

2,443,532

UNITED STATES PATENT OFFICE 2,443,532

WAX-OIL SEPARATION WITH DEHYDRATION OF SOLVENT THEREFOR

Clyde H. O. Berg, Long Beach, Calif., assignor to Union Oil Company of California, Los Angeles, Calif., a corporation of California Application July 9, 1945, Serial No. 603,848

12 Claims. (Cl. 196—18)

This invention relates to a process of separating wax and oil from wax-oil mixtures such as waxy oils or oily waxes. More particularly the invention pertains to an improved method of operation of deoiling or dewaxing processes involving a new mode of dehydrating the solvent used in the process so as to eliminate the conventional salt bed driers.

Petroleum waxes which can be obtained by separation from petroleum oils are mixtures of high molecular weight paraffins, probably normal or isoparaffins having from about 20 to about 40 carbon atoms in their molecular structure. Upon distilling crude oils the waxes are concentrated in the high boiling fractions normally employed in the preparation of lubricating oils and inasmuch as these waxes will interfere with the lubricating quality of such oils at low temperatures it is necessary to treat those stocks in which they are contained to effect their removal. Further, these waxes upon separation from the stocks in which they are contained become valuable by-products and are in most part readily marketable.

There are many processes which are currently employed to effect the separation of such wax-oil mixtures which, however, generally utilize the similar principle of chilling the oil-wax mixture to effect the precipitation of said wax and separating the precipitated wax from the mixture in the presence of a diluent such as the ketones, alcohols, aromatics, petroleum naphthas or mixtures of these. From this separation an oil containing wax commonly known as "slack wax" is obtained which must be further deoiled by a process similar to the above to obtain an oil-free wax. Recent developments in the art include such modifications of the above described process as a reversal of the procedure in which the deoiling and dewaxing are accomplished in one operation.

In a conventional process for separating wax and oil, the wax-oil mixture is dissolved in a solvent or a mixture of solvents at an elevated temperature. The solution is then chilled to a sufficiently low temperature to bring about the precipitation of the wax which may subsequently be removed by filtration, centrifuging or the like. In general the solvents employed in this process are chosen for their properties of preferential solubility toward the oil in the oil-wax mixture and on the basis of the type of crystal structure and subsequent ease of separation of the wax precipitate formed therein. In this method of dewaxing the wax cake obtained is classified as a slack wax containing appreciable proportions of entrained oil. It is not unusual for the wax cake recovered in this type of operation to contain as much as 60% by weight of oil. With many types of oils and solvents it is necessary to add crystallization modifiers to the oil before chilling the wax-oil solution in order to obtain a slurry which may be filtered or otherwise separated at an economical rate. Further than this many stocks such as will hereinafter be discussed contain wax of such a nature that the separation becomes virtually impossible by this method with the solvent now in use.

The wax thus obtained, being a composite of substantially the entire wax content of the oil processed and containing as pointed out above large percentages of oil, must be further treated in a deoiling process to remove said oil and to yield a marketable wax. Further, if it is desired to resolve the wax thus obtained into a high melting point and low melting point wax it is necessary in some manner to reprocess the composite.

A more recent advancement in the art of dewaxing of oils or of deoiling of waxes is disclosed in United States Patent No. 2,229,658, and involves what has been termed the limited dilution principle and is often referred to as a "reverse" dewaxing process. This process consists essentially in chilling the wax-oil mixture prior to the addition of all the necessary solvent thereto which chilling may be accomplished in one or more stages accompanied by the addition of predetermined proportion of the desired solvent at various stages. By operating in this manner very little of the crystallized wax will be redissolved by the solvent and the slurry is formed which filters very rapidly yielding a wax cake which will not crack during filtration or while washing with the solvent. In this manner it is possible by operating at temperatures in the neighborhood of from 40° F. to 50° F. to separate in the first stage of the operation a high melting point wax in the form of large well defined substantially oil free crystals, which wax without further treatment will contain generally less than about 1% of oil. In the second stage of this "reverse" process the solvent oil mixture is further chilled to a temperature of about 0° F. to —15° F. and filtered yielding a low oil content low melting point wax and a wax-free low pour point oil. This reverse process has many advantages over the conventional one-stage dewaxing process which are fully discussed in the above-mentioned patent.

In all of these processes the separation is accomplished crystallizing the wax under controlled conditions in the presence of all or part of the added solvent, subsequently diluting with additional solvent and filtering. The wax filter cake and oil filtrate each containing considerable quantities of the solvent employed in the process are subsequently introduced into a flash column or the like wherein a substantial part of the solvent in the fraction is flashed overhead and is returned to solvent storage. However, considerable quantities of solvent remain in both the wax and the oil after this flash treatment, and this residual solvent is removed by steam stripping the wax and oil fractions. From this steam stripping operation a water-solvent mixture results which must be dehydrated prior to the reuse of the solvent in the process.

The conventional method for dehydrating the solvent obtained from the steam stripping of the wax-solvent or oil-solvent fractions is by simple fractional distillation, the efficiency of which is dependent upon the type of solvent used. In this regard there are many solvents such as the alcohols and ketones which may not be completely dehydrated by simple fractional distillation due to the formation of azeotropes between water and the ketones or alcohols. Inasmuch as the majority of dewaxing or deoiling operations employ an alcohol or ketone solvent, a mixture of the two or a mixture of alcohol or ketone with an aromatic or other hydrocarbon the formation of an azeotrope between water and the solvent is of considerable significance. This water is usually removed by passing the solvent-water mixture through the salt bed drier to effect the removal of the water. These salt bed driers present many operational difficulties due to sliming, caking, and the like, and it is the outstanding advantage of the present invention that I am able to eliminate these driers in dewaxing or deoiling operations.

Generally it is an object of the present invention to improve the art of dewaxing or deoiling of wax-oil mixtures by providing an improved method of dehydrating the solvent employed in the process, which solvent becomes wet when residual amounts thereof are stripped from the oil and wax fractions with steam.

More specifically it is an object of my invention to eliminate the necessity of employing the conventional salt bed driers normally required in dewaxing or deoiling operations and thus eliminate the difficulties normally accompanying this method of dehydrating the solvent.

Other objects and advantages of the present invention will occur to those skilled in the art as the description thereof proceeds.

I have found that it is possible to effect the dehydration of the dewaxing or deoiling solvent by a simple countercurrent contact with at least a portion of the wax-oil feed to the dewaxing or deoiling process. This is readily accomplished by heating a portion of the feed to a temperature in the range of about 150° F. to about 300° F. and contacting the heated feed with a wet solvent which has the effect of reducing the solubility of the water in the solvent sufficiently to effect a phase separation thus making it possible to withdraw the water phase from the feed-solvent phase.

The temperature of the feed contacting the wet solvent is not critical and is governed only as far as minimum temperature is concerned, by the melting point of the wax contained in the feed. Thus the only temperature limitation that can be set is that it is sufficient to insure complete solution of the wax in the oil. Further higher temperatures may be employed if desirable to increase the solubility of the solvent in the oil but if temperatures above about 200° F. are employed it is necessary to operate the dehydration process under a sufficient pressure to maintain the water in the liquid phase to insure proper phase separation of the solvent-feed solution from the water.

My invention can be best understood by reference to the attached process drawing which shows the dehydration operation as herein disclosed in conjunction with a conventional dewaxing or deoiling process.

In the drawing the wax-oil feed is withdrawn from storage tank 10 by means of line 11 controlled by valve 12 and is pumped by pump 13 through line 14 where it is divided between lines 17 and 18. A portion of the feed is passed through line 17 into interchanger 19 and from thence into drier 20. In drier 20 the heated portion of feed introduced therein is contacted with wet solvent introduced into drier 20 by means of line 21 effecting the dehydration thereof as hereinafter described. A major proportion of the feed passes through line 18 controlled by valve 22 into manifold 24. The dehydrated solvent in solution with the portion of the feed introduced to drier 20 is withdrawn therefrom by means of line 25, controlled by valve 26 and passes into line 27. Additional solvent is withdrawn from storage tank 29 by means of line 30, controlled by valve 31 and is pumped by pump 32 via line 33 into line 27 where it is commingled with the solvent-feed solution, withdrawn from drier 20. The solvent-feed solution then passes through valve 28 into manifold 24 where it mixes with the major proportion of the wax-oil feed from feed tank 10. The feed-solvent mixture is then passed through heater 34 wherein complete solution of the solvent in the feed is effected, and from heater 34 it passes through line 36 into chiller 37 wherein the temperature is sufficiently reduced to effect the precipitation of the desired wax.

In an alternative method of operation hereinbefore referred to as the limited dilution process a substantial portion of the solvent is taken from tank 29 by means of line 30 controlled by valve 31 and is passed into line 38, controlled by valve 39 and is pumped by pump 40 through line 41 controlled by valves 42, 43, 44, and 45, wherein any desired proportion of the solvent may be introduced into the chiller at various stages of the chilling operation. It is to be understood that my invention is in no way limited to the particular type of dewaxing or deoiling process employed inasmuch as the essence thereof is simply the dehydration of the wet solvent as hereinafter described, which operation is necessary regardless of the type of dewaxing or deoiling process employed.

The chilled solvent-wax mixture is passed from chiller 37 via line 46 into filter 48 wherein the precipitated wax is filtered from the remaining oil-solvent solution. Additional quantities of solvent are withdrawn from tank 29 by means of lines 30 and 49 controlled by valve 50 and are pumped by pump 51 through line 52 into the filter 48 to serve as wash solvent for the filter cake.

The filter cake comprising wax, substantial quantities of solvent, and possibly small amounts of oil is withdrawn from filter 48 by means of line 53, controlled by valve 54 and is pumped by pump 55 through line 56 into the flash drum 58. In transferring the filter cake from the filter 48 to the flash drum 58 it may be necessary to heat the cake sufficiently to permit its flow through the system.

In flash drum 58 a major proportion of the solvent in the filter cake is flashed from the wax being withdrawn from flash drum 58 by means of line 59, controlled by valve 60, passing into line 61 and is pumped by pump 62 through line 63 back to solvent storage tank 29. The wax bottoms from flash drum 58 still containing at least a portion of the solvent is withdrawn therefrom by means of line 64, controlled by valve 65 and passes through line 66 into stripper 68. Steam is introduced into stripper 68 by means of line 69 effecting the removal of the residual solvent from the wax. The essentially solvent-free wax is withdrawn from stripper 68 by means of line 70, controlled by valve 71 and is pumped by pump 72 through line 73 into wax storage tank 74. The solvent-steam mixture is taken overhead from stripper 68 by means of line 75, controlled by valve 76 and is passed through line 77 into line 78 where it is mixed with further quantities of wet solvent as hereinafter described.

The oil-solvent filtrate is withdrawn from filter 48 by means of line 79, controlled by valve 80, and is pumped by pump 81 through line 82 into flash drum 84. Here again the solvent is flashed from the heavier component, in this case oil, and is taken overhead from flash drum 84 by means of line 85, controlled by valve 86, passing through line 61 joining therein the solvent flashed from the wax in flash drum 58, and is pumped by pump 62 via line 63 back to solvent storage tank 29. In this manner a major proportion of the solvent is recovered from the wax and oil fractions in the absence of steam making dehydration thereof unnecessary.

The oil, still containing residual quantities of solvent, is withdrawn from the bottom of flash drum 84 by means of line 87, controlled by valve 88 and is passed via line 89 into stripper 90. Steam is introduced into stripper 90 by means of line 91 thus removing the last traces of solvent from the oil. The solvent-free oil is removed from the bottom of stripper 90 by means of line 92, controlled by valve 93, it is pumped by pump 94 through line 95 to oil storage tank 96. The solvent-steam mixture is taken overhead from stripper 90 by means of line 97, controlled by valve 98 and passes through line 99 into line 78, wherein it is mixed with wet solvent passing overhead from the wax stripper 68. The wet solvent passes from line 78, controlled by valves 100 and 101, either directly into the fractionator 104 or alternatively through valve 101 via line 102 to be pumped by pump 103 via line 21 into the drier 20. The choice of these alternative procedures is dependent upon the amount of moisture in the solvent. If the moisture content is sufficiently high to make direct drying according to the present process undesirable, the solvent may be passed directly into fractionator 104, wherein at least a portion of the water is separated from the solvent and is withdrawn from fractionator 104 by means of line 107, controlled by valve 108, and is pumped by pump 109 via line 110 to waste.

However, if an alcohol or ketone is contained in the solvent, which is normally the case, a water solvent azeotrope will be obtained as the overhead product from fractionator 104. This azeotrope is withdrawn from the fractionator by means of line 105 controlled by valve 106 passing into line 102 and is pumped by pump 103 via line 21 into drier 20. It is to be understood that the wet solvent stream in line 78 may be split in any desired manner; thus the entire stream may be passed directly into fractionator 104 or the fractionator may be by-passed and the entire stream passed directly into drier 20. Alternatively the wet solvent stream may be split in any desired portion a part thereof being passed into fractionator 104 and the remainder into drier 20. In any case the wet solvent is introduced into drier 20 and is contacted countercurrently with a portion of the wax-oil feed heated to a temperature of between about 150° F. and 300° F. which has the effect of extracting the solvent from the water resulting in a substantially dehydrated solvent feed solution which is taken overhead from drier 20 by means of line 25 as hereinbefore disclosed. The water separated from the solvent is withdrawn from the bottom of drier 20 by means of line 111, controlled by valve 112 and is pumped by pump 113 through line 114 to waste. Although countercurrent drying of the solvent with a portion of the hot feed has been described and from a commercial point of view is the preferred method, I do not wish to be limited thereby inasmuch as concurrent or batchwise dehydration of the solvent may also be employed.

From the description of the drawing the ease by which I may accomplish the dehydration of the solvent by the method of my invention may be readily appreciated. By this method it is possible to eliminate entirely the use of the troublesome salt bed driers and to effect the dehydration of the solvent by the simple process of countercurrent extraction with a portion of the feed to the process. In this regard, the quantity of feed employed in the dehydration is not critical inasmuch as it may range from any proportion sufficient to effect the dehydration, which amount is approximately equivalent to the quantity required to completely dissolve the solvent to be dehydrated, to any larger proportion or even to the total quantity of the feed. Economically the minimum amount of feed is the most desirable in order to eliminate the necessity of passing the entire amount through the dehydration operation.

Further, it is evident from the above description that the particular process used in the dewaxing or deoiling of the wax-oil feed is immaterial to the utility of the invention inasmuch as in any conventional process it is necessary to effect the removal of residual quantities of solvent from the wax and oil fractions by steam stripping, and as a result a wet solvent will be obtained in any of these processes. Also, although the chief application of my invention is for the dehydration of those solvents which form azeotropes with water such as the ketones and alcohols because of the impossibility of separating such solvents from water by simple distillation, this simplified process of dehydration also finds use in those cases where non-water azeotrope forming solvents are employed, whereby in many cases the distillation step may be entirely eliminated. As an example of the utilization of the new and novel method of dehydrating these solvents, according to my invention, if methyl ethyl ketone is the solvent employed a methyl ethyl ketone-water azeotrope will result from the fractionation of the methyl ethyl ketone, steam stripped from the wax and oil fraction. This azeotrope will contain approximately 10% water, and as such is not usable in the process. By the method of my invention the methyl ethyl ketone-water azeotrope is extracted as hereinbefore described with a small quantity of the feed thus removing the water from the methyl ethyl ketone or alternatively it may be considered as removing the methyl ethyl ketone from the water, thus not only making it useful in the process but effecting its incorporation in the feed in the same operation.

Other solvents which are normally employed in a dewaxing or deoiling operation include the various ketones such as acetone, methyl propyl ketone, methyl isobutyl ketone, methyl n-butyl ketone, methyl isopropyl ketone, and the like; alcohols such as ethyl alcohol, isopropyl alcohol, normal propyl alcohol and the like; aromatic hydrocarbons such as benzene and toluene, petroleum naphtha; halogenated hydrocarbons such as trichloroethylene and the like, or more commonly known mixtures of one or more of these solvents.

The process of my invention finds application in the dehydration of the solvent-water mixture occurring in the process of dewaxing or deoiling of wax-oil mixtures and realizing that many modifications may occur to those skilled in the art without departing from the spirit or scope of the following claims, and not intending to be limited by the foregoing description thereof, I claim as my invention:

1. In a process for segregating wax and oil from a wax-oil mixture which comprises solubilizing said wax-oil mixture in a solvent, chilling the wax-oil-solvent solution to crystallize at least a portion of the wax contained in the solution, filtering the wax-oil-solvent slurry to separate the crystallized wax from said slurry, flashing a substantial portion of the solvent remaining in the wax filter cake and in the filtrate from said filter cake and said filtrate and steam stripping said filter cake and said filtrate to remove the remaining solvent therefrom the improvement comprising contacting the wet solvent obtained from said steam stripping operations with a portion of the wax-oil feed which has been heated to a temperature sufficient to solubilize the wax in the oil, and removing the water separating from the wax-oil-solvent solution which results.

2. In a process for segregating wax and oil from a wax-oil mixture which comprises solubilizing said wax-oil mixture in a solvent, chilling said wax-oil-solvent solution to crystallize at least a portion of the wax contained in the solution, filtering the wax-oil-solvent slurry to separate the crystallized wax from said slurry, flashing a substantial portion of the solvent remaining in the wax-filter cake and in the filtrate from said filter cake and said filtrate, steam stripping said filtrate to remove the remaining solvent therefrom and distilling the wet solvent obtained from said steam stripping operations to remove a portion of the water therefrom the improvement comprising contacting the partially dehydrated solvent with a portion of the wax-oil feed which has been heated to a temperature sufficient to solubilize the wax in the oil and removing the water separating from the wax-oil solvent solution which results.

3. A process according to claim 1 in which the wax-oil feed contacted with the wet solvent is maintained at a temperature in the range of about 150° F. to about 300° F. and the pressure in the contacting vessel is adjusted to maintain the water in the liquid phase.

4. A process according to claim 2 in which the wax-oil feed contacted with the wet solvent is maintained at a temperature in the range of about 150° F. to about 300° F. and the pressure in the contacting vessel is adjusted to maintain the water in the liquid phase.

5. A process according to claim 2 in which the solvent employed comprises a low molecular weight alcohol.

6. A process according to claim 2 in which the solvent employed comprises methyl ethyl ketone.

7. A process according to claim 2 in which the solvent employed comprises a low molecular weight ketone.

8. A process according to claim 2 in which the solvent employed comprises an aromatic hydrocarbon.

9. In a process for segregating wax and oil from a wax-oil mixture which comprises dissolving said wax-oil mixture in a substantially water soluble solvent, chilling the wax-oil-solvent solution to crystallize at least a portion of the wax contained in the solution, separating the crystallized wax from the oil-solvent solution, flashing a substantial portion of the solvent remaining in said separated wax and from said separated oil-solvent solution, and separately steam stripping said separated wax and said separated oil-solvent solution to remove the remaining solvent therefrom, the improvement comprising contacting the wet solvent obtained from said steam stripping operations with a portion of the wax-oil feed, and removing the water separating from the wax-oil-solvent solution which results.

10. In a process for segregating wax and oil from a wax-oil mixture which comprises dissolving said wax-oil mixture in a solvent, chilling the wax-oil-solvent solution to crystallize at least a portion of the wax contained in the solution, separating the crystallized wax from the oil-solvent solution, flashing a substantial portion of the solvent remaining in said separated wax and from said separated oil-solvent solution, and separately steam stripping said separated wax and said separated oil-solvent solution to remove the remaining solvent therefrom, the improvement comprising contacting the solvent obtained from said stripping operation, which solvent contains only a minor proportion of water, with a portion of the wax-oil feed which has been heated to a temperature sufficient to solubilize the wax in the oil and removing the said minor proportion of water which separates from the resultant wax-oil-solvent solution.

11. In a process for segregating wax and oil from a wax-oil mixture which comprises dissolving said wax-oil mixture in a substantially water soluble solvent, chilling the wax-oil-solvent solution to crystallize at least a portion of the wax contained in the solution, separating the crystallized wax from the oil-solvent solution, flashing a substantial portion of the solvent remaining in said separated wax and from said separated oil-solvent solution, and separately steam stripping said separated wax and said separated oil-solvent solution to remove the remaining solvent therefrom, the improvement comprising contacting the solvent obtained from said stripping operation, which solvent contains only a minor proportion of water, with a portion of the wax-oil feed which has been heated to a temperature sufficient to solubilize the wax in the oil and removing the said minor proportion of water which separates from the resultant wax-oil-solvent solution.

12. In a process for segregating wax and oil from a wax-oil mixture which comprises dissolving said wax-oil mixture in a solvent, chilling the wax-oil-solvent solution to crystallize at least a portion of the wax contained in the solution, separating the crystallized wax from the oil-solvent solution, flashing a substantial portion of the solvent remaining in said separated wax and from said separated oil-solvent solution and separately steam stripping said separated wax and said separated oil-solvent solution to remove the remaining solvent therefrom, the improvement comprising contacting the wet solvent obtained from said steam stripping operation, without prior solvent water separation, with a portion of the wax-oil feed which has been heated to a temperature sufficient to solubilize the wax in the oil and removing the water separating from the wax-oil solvent solution which results.

CLYDE H. O. BERG.

REFERENCES CITED

The following references are of record in the file of this patent:

UNITED STATES PATENTS

| Number | Name | Date |
| --- | --- | --- |
| 2,030,284 | Diggs | Feb. 11, 1936 |
| 2,080,222 | Duffey | May 11, 1937 |
| 2,143,872 | Forrest et al. | Jan. 17, 1939 |
| 2,160,985 | Pokorny | June 6, 1939 |
| 2,167,730 | Smoley | Aug. 1, 1939 |
| 2,244,407 | Smisloff | June 3, 1941 |
| 2,305,248 | Fleer et al. | Dec. 15, 1942 |
| 2,319,381 | Wickham et al. | May 18, 1943 |
| 2,339,786 | Larsen et al. | Jan. 25, 1944 |
| 2,356,346 | Packie et al. | Aug. 22, 1944 |
| 2,397,868 | Jenkins | Apr. 2, 1946 |